Sept. 28, 1971   D. L. McIVOR ET AL   3,608,197
CARPET KNIFE AND GUIDE
Filed July 17, 1968   2 Sheets-Sheet 1

INVENTORS
DAVID L. McIVOR &
RICHARD A. ROBINSON
BY
*Irving M. Weiner*
ATTORNEY

INVENTORS
DAVID L. McIVOR &
RICHARD A. ROBINSON
BY *Irving M. Weiner*
ATTORNEY 3,608,197
CARPET KNIFE AND GUIDE
David Lloyd McIvor, 5812 Appoline, Dearborn, Mich. 48126, and Richard Alvin Robinson, 15489 Lexington, Redford, Mich. 48239
Filed July 17, 1968, Ser. No. 745,513
Int. Cl. B26b 3/08
U.S. Cl. 30—294    4 Claims

ABSTRACT OF THE DISCLOSURE

A device for guiding the cutting of two carpets requiring a seam at a doorway between two rooms. An adjustable carpet knife slides in a slot in the device to cut each carpet to a predetermined depth and along an identical line relative to the doorjambs. The device may consist of two sections which fit in the ordinary toolbox.

BACKGROUND OF THE INVENTION

(1) Field of the invention

The present invention pertains to the field of art encompassing cutting guides, strip trimmers, and seam cutters, and especially relates to a novel method of cutting, marking or scoring relatively flat items preparatory to forming a seam between such items. The present invention is particularly useful in forming a seam between two carpets within a doorway.

(2) Description of the prior art

Prior art cutting guides for cutting, marking or scoring glass, cloth, carpets, plastics, or other materials require elaborate and unwieldy apparatus, often including complicated table mechanisms. None of the prior art devices provides a readily portable and accurate cutting guide which can be used in conjunction with the conventional adjustable carpet-cutting knife to produce perfect seams even by the unskilled operator.

SUMMARY OF THE INVENTION

The present invention provides a device for guiding a cutting, marking or scoring implement, including a main body member having at least two major surfaces which are substantially parallel to each other. The main body member is adapted to be held stationary relative to an item to be cut, marked or scored with the two major surfaces of the main body member being disposed substantially parallel to the surface of the item which is to be cut, marked or scored. The main body member has a guide slot extending therethrough. The guide slot has side walls which are substantially parallel to each other, and which are arranged substantially perpendicular to the two major surfaces of the main body member. The cutting, marking or scoring implement has a tip or blade element which is adapted to be disposed within the guide slot, and has an abutment portion adjacent the blade element. The blade element has at least one dimension which is substantially equal to or less than the perpendicular distance between the side walls of the guide slot to permit relative motion between the blade element and the main body member, or between the blade element and the item to be cut, marked or scored. The abutment portion of the cutting, marking or scoring implement is disposed in contiguity with at least one of the two major surfaces of the main body member to guide the blade element within the guide slot, and to control the depth of penetration of the blade element into the surface of the item which is to be cut, marked or scored.

The present invention also provides a method of cutting, marking or scoring at least two items to be disposed adjacent to one another or seamed. The method includes the steps of placing a guide device adjacent the first item and in a predetermined position relative to an external element, such as a doorjamb. Then, a cutting, marking or scoring implement is moved within a slot in the guide device to cut, mark or score the first item in a line determined by the slot. Next, the first item is temporarily removed. Then a second item of the two items is placed in a position for cutting, marking or scoring. The guide device is then placed adjacent the second item and in the same predetermined position relative to the same external element. Then, the cutting, marking or scoring implement is moved within the slot in the guide device to cut, mark or score the second item along the same line determined by the slot, whereby both the first and second items are cut, marked or scored along an identical line so that the first item will mate, for example for a seam, substantially perfectly with the second item.

DESCRIPTION OF THE PREFERRED EMBODIMENTS

Figure 1:
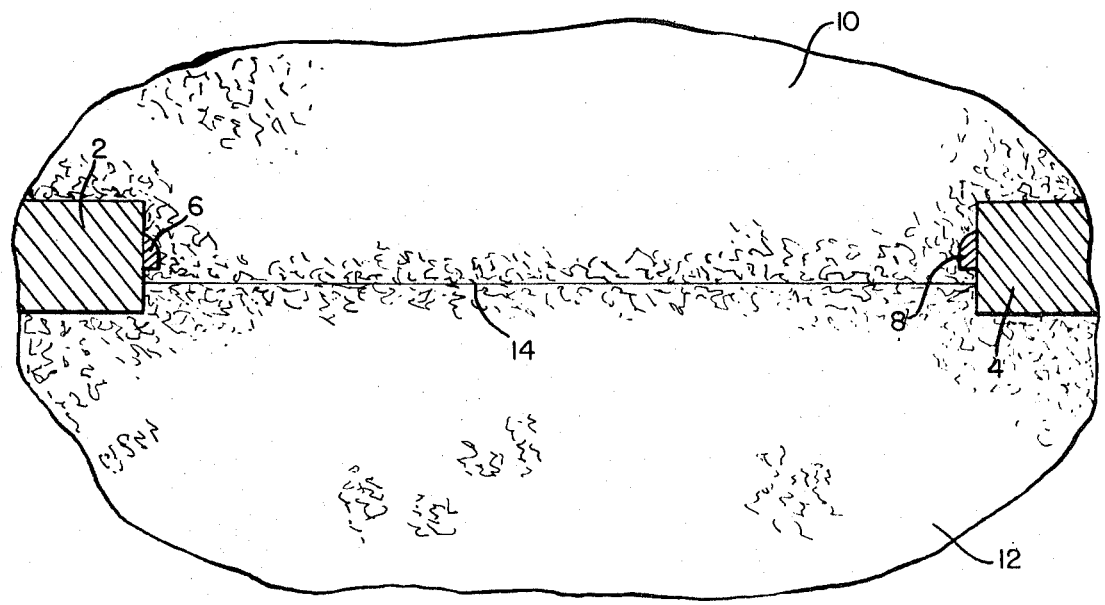
FIG. 1 is a top plan view of a doorway between two rooms each having a different carpet.

With reference to FIG. 1, there is shown the ends of walls 2 and 4 having affixed thereto doorjambs 6 and 8, respectively, within a doorway between two rooms. The floor of one room is to be covered with a first carpet 10, and the floor of the other room is to be covered with a second carpet 12. It is usually desired to arrange a seam 14 between carpets 10 and 12 which lies perpendicular to the ends of walls 2 and 4 and which is located at a predetermined distance, e.g., ⅞ of an inch, from doorjambs 6 and 8.

Up to the present time, carpet layers merely freehandedly cut the carpets, and as a result the carpets do not mate properly for the intended seam or the intended seam is not ultimately located where desired within the doorway. The present invention solves these problems, and eliminates the guesswork, the necessity for any measurements, and the accidental cutting of the padding beneath the carpets.

Figure 2:
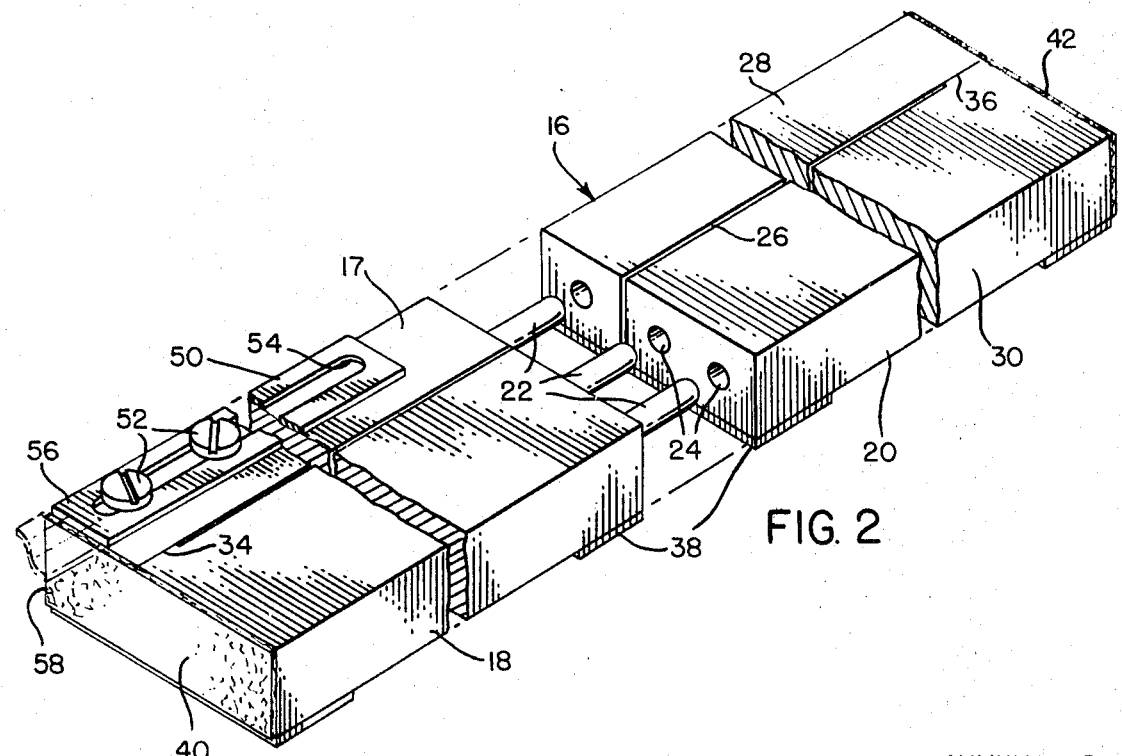
FIG. 2 is a perspective view of a cutting guide device according to one possible embodiment of the present invention.

A form of a cutting, marking, or scoring guide device 16 according to present invention is shown in FIG. 2. The device 16 may be fabricated as one integral main body member 17, or may include two ⅜" x 14¾" aluminum sections 18 and 20, when assembled by means of accurately-located and mating metal rods 22 and holes 24, form a 29½" main body member 17 which fits easily within the average 30" doorway (see FIG. 3).

Figure 4:
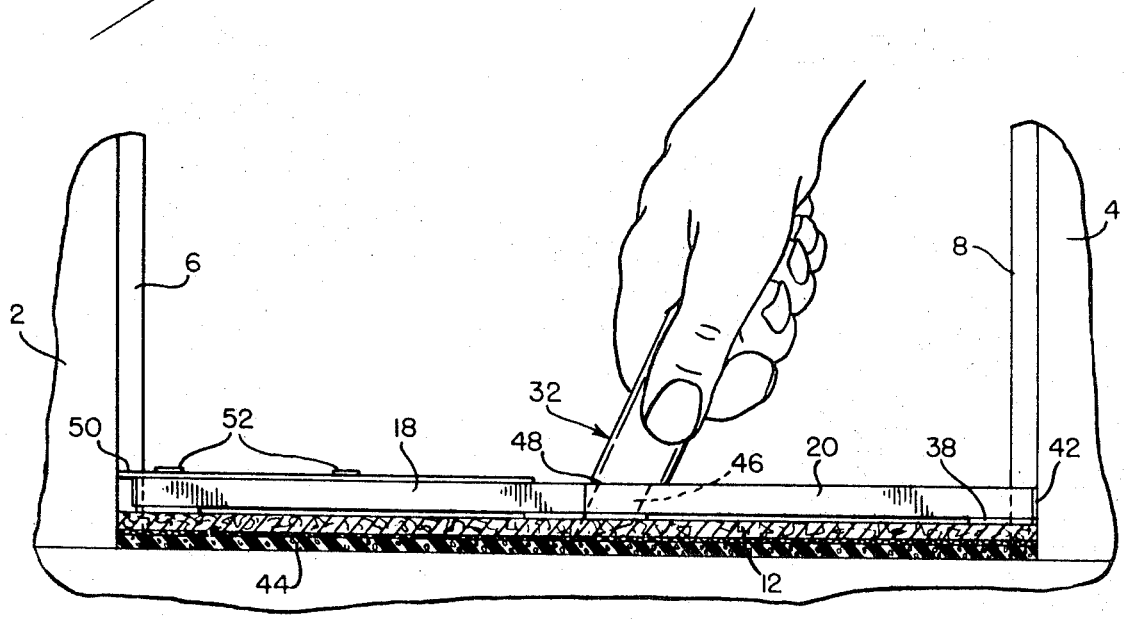
FIG. 4 is a vertical view, partially in section, taken along line 4—4 of FIG. 3 showing a carpet knife within the knife-guiding slot.

A 0.020" wide guide slot 26 partitions the main body member 17 into a ⅞" portion 28 and a 1⅝" portion 30 which provides a place for the carpet layer to hold down the device 16 with one hand while moving the cutting or scoring implement, such as knife 32, with his other hand (see FIG. 4). Small unslotted areas 34 and 36 serve to join portions 28 and 30. The guide slot 26 may have parallel side walls which are normal to the top and bottom major surfaces of main body member 17.

Affixed to the bottom surface of main body member 17 are friction elements 38, such an anti-skid or emery pads, to prevent slippage between the main body member 17 and the item, such as carpet 10 or 12, to be cut, marked or scored. Affixed to at least one end of main body member 17 are elements 40 and 42 of relatively soft material, such as felt, to prevent marring of external structure, such as the surfaces of walls 2 and 4.

Figure 3:
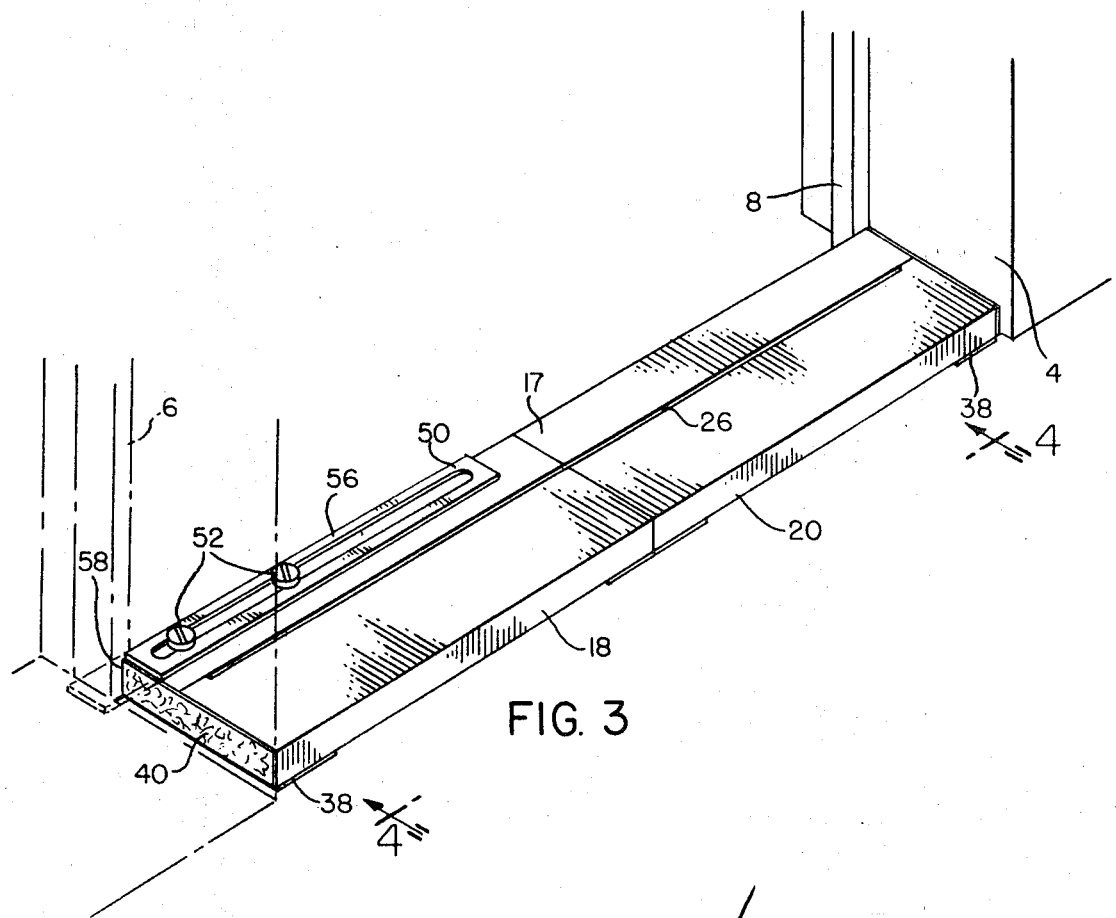
FIG. 3 is a perspective view showing the cutting guide device of FIG. 2 positioned in the doorway of FIG. 1.

The present invention also provides a novel method of cutting, marking or scoring items to be disposed adjacent to one another or seamed. With regard to carpet laying, the novel method may proceed as follows. After the padding 44 (FIG. 4) and carpets 10 and 12 for both rooms have almost completely been laid, the carpet layer then proceeds to cut both carpets for the doorway seam 14. To do so, he would first place one of the carpets, e.g., carpet 10, on top of the padding 44 in the area of the doorway. Then, the cutting guide device 16 would be placed against doorjambs 6 and 8 (as shown in FIGS. 3 and 4) and on top of carpet 10, the blade 46 of knife 32 inserted in guide slot 26, and the knife 32 moved within slot 26 to cut carpet 10 in a predetermined line controlled by slot 26.

The device 16 and carpet 10 are then temporarily removed from the doorway area. Now carpet 12 is placed over padding 44 in the doorway area. Again device 16 is placed against doorjambs 6 and 8, but this time on top of carpet 12. Blade 46 is again inserted in the same slot 26 and moved to cut carpet 12 along the same predetermined line similar to carpet 10. The result is perfectly mating carpet edges, forming a seam 14, cut through the same pre-located guide slot 26 in the same location, without any need for markings, measurements or careful manipulations.

Referring to FIG. 4, it should be noted that knife 32 has an abutment portion 48 which slides on the top major surfaces of main body member 17. Carpet knives usually have an adjustable blade 46 which can be set so that the exposed blade element is equal in length to the combined thickness of the main body member 17, the friction element 38, and the carpet to be cut. In this manner, the properly adjusted blade 46 and the cooperation between abutment portion 48 and main body member 17 control the depth of cut and thereby prevent accidental cutting of padding 44.

A first embodiment of the invention including at least two readily-separable and removably-connected 14¾" sections 18 and 20 easily accommodates the usual 30" doorway. A second embodiment or modification is also shown in FIGS. 2, 3 and 4 for extending the effective length of the cutting guide device 16 to accommodate doorways wider than 30". A slidable extension member or mechanism 50 may be adjustably secured to main body member 17 by retaining screws 52 disposed within a slot 54 of member 50. When, for example a 36" doorway is encountered, section 20 is positioned against doorjamb 8 and the end of wall 4, and member 50 is extended to bear against doorjamb 6 and the end of wall 2. With such an extension mechanism it is necessary for the long edge 56 of member 50 to be coplanar with side 58 of section 18. Other means for extending the overall length of the device, as by a telescoping mechanism, may also be employed.

The guide device may also be used to accurately cut, score or mark a great variety of items and materials other than carpeting, such as wood, textiles, plastics, metals, glass, cardboard, paper, etc. For example, when glass is being cut or scored, a glass cutter is merely substituted for the carpet knife. Marking tools, razors, scratch awls, etc. may be used, also.

The guide slot 26 may have various predetermined shaped side walls to accommodate a variety of different cutting, scoring, or marking implements, but flat side walls normal to the major surfaces of device 16 function well with flat blade elements. Also, the slot 26 may have shapes other than the straight line shape described in connection with the first embodiment. For example, the slot 26 may have an elongated sinusoidal shape to produce undulations or curves in the cut or mark generated thereby.

Various other modifications will occur to those skilled in the art within the spirit of invention and the scope of the appended claims.

What is claimed is:

1. A guide device for cutting carpets to be seamed, comprising in combination:
   a main body member having two major surfaces which are substantially parallel to each other;
   said main body member being adapted to be held stationary relative to any one of said carpets to be cut with said two major surfaces of said main body member being positioned substantially parallel to said one of said carpets;
   said main body member having a knife-guide slot extending therethrough;
   said knife-guiding slot having side walls which are substantially parallel to each other and which are disposed substantially perpendicular to said two major surfaces;
   a knife having a blade adapted to slide within said said slot, and having an abutment adapted to slide upon one of said two major surfaces;
   said blade having a thickness which is slightly less than the minimum distance between said side walls of said slot;
   said knife abutment cooperating with said one of said two major surfaces to control the depth of penetration of said blade into said carpets to be seamed;
   said guide device being so shaped, positioned and dimensioned to fit between the walls forming a doorway with portions of said guide device in contiguity with doorjambs affixed to said ends of said walls; and
   said knife-guide slot being disposed in said main body member a predetermined distance from said doorjambs and substantially perpendicular to said walls when said guide device is in contiguity with said doorjambs.

2. A device for guiding a cutting, marking or scoring implement, comprising in combination:
   a main body member having at least two major surfaces which are substantially parallel to each other;
   said main body member being adapted to be held stationary relative to an item to be cut, marked or scored with said two major surfaces of said main body member being disposed substantially parallel to the surface of said item which is to be cut, marked or scored;
   said main body member having a guide slot extending therethrough;
   said guide slot having side walls which are substantially parallel to each other and which are arranged substantially perpendicular to said two major surfaces of said main body member;
   said cutting, marking or scoring implement having a blade element which is adapted to be disposed within said guide slot, and having an abutment portion adjacent said blade element;
   said blade element having at least one dimension which is substantially equal to or less than the perpendicular distance between said side walls of said guide slot to permit relative motion between said blade element and said main body member or between said blade element and said item to be cut, marked or scored;
   said abutement portion being disposed in contiguity with at least one of said two major surfaces to guide said blade element within said guide slot and to control the depth of penetration of said blade element into said surface of said item which is to be cut, marked or scored;
   said main body member being comprised of at least two readily-separable and removably-connected sections which meet in a plane that is substantially perpendicular to said two major surfaces;

each of said sections including a portion of said guide slot and means for connecting to the other of said sections; and said sections being adapted to be connected to provide a single continuous guide slot.

3. A device for guiding a cutting, marking or scoring implement, comprising in combination:
- a main body member having at least two major surfaces which are substantially parallel to each other;
- said main body member being adapted to be held stationary relative to an item to be cut, marked or scored with said two major surfaces of said main body member being disposed substantially parallel to the surface of said item which is to be cut, marked or scored;
- said main body member having a guide slot extending therethrough;
- said guide slot having side walls which are substantially parallel to each other and which are arranged substantially perpendicular to said two major surfaces of said main body member;
- said cutting, marking or scoring implement having a blade element which is adapted to be disposed within said guide slot, and having an abutment portion adjacent said blade element;
- said blade element having at least one dimension which is substantially equal to or less than the perpendicular distance between said side walls of said guide slot to permit relative motion between said blade element and said main body member or between said blade element and said item to be cut, marked or scored;
- said abutment portion being disposed in contiguity with at least one of said two major surfaces to guide said blade element within said guide slot and to control the depth of penetration of said blade element into said surface of said item which is to be cut, marked or scored; and
- said main body member being shaped to conform to and to be aligned with predetermined external structure, and
- an element of relatively soft material is affixed to at least one end of said main body member to prevent marring of said external structure.

4. A device for guiding a cutting, marking or scoring implement, comprising in combination:
- a main body member having at least two major surfaces which are substantially parallel to each other;
- said main body member being adapted to be held stationary relative to an item to be cut, marked or scored with two major surfaces of said main body member being disposed substantially parallel to the surface of said item which is to be cut, marked or scored;
- said main body member having a guide slot extending therethrough;
- said guide slot having side walls which are substantially parallel to each other and which are arranged substantially perpendicular to said two major surfaces of said main body member;
- said cutting, marking or scoring implement having a blade element which is adapted to be disposed within said guide slot, and having an abutment portion adjacent said blade element;
- said blade element having at least one dimension which is substantially equal to or less than perpendicular distance between said side walls of said guide slot to permit relative motion between said blade element and said main body member or between said blade element and said item to be cut, marked or scored;
- said abutment portion being disposed in contiguity with at least one of said two major surfaces to guide said blade element within said guide slot and to control the depth of penetration of said blade element into said surface of said item which is to be cut, marked or scored; and
- a movably adjustable extension mechanism which is secured to said main body member to vary the effective length of said main body member.

References Cited

UNITED STATES PATENTS

| | | | |
|---|---|---|---|
| 392,143 | 10/1888 | Wright | 33—32B |
| 833,675 | 10/1906 | Chezem | 33—32B |
| 1,122,050 | 12/1914 | Williams | 33—33X |
| 1,134,542 | 4/1915 | Larson | 30—293 |
| 1,895,754 | 1/1933 | Finkenwirth | 33—32XB |
| 2,208,412 | 7/1940 | Doniger | 269—1 |
| 2,833,350 | 5/1958 | Merkur | 83—455 |
| 2,920,388 | 1/1960 | Herndon | 30—293 |

FRANK T. YOST, Primary Examiner

U.S. Cl. X.R.

83—455; 269—1